United States Patent [19]
Miller

[11] Patent Number: 5,185,564
[45] Date of Patent: Feb. 9, 1993

[54] BATTERY DISCHARGE APPARATUS

[76] Inventor: Michael C. Miller, 4943 Barrie NW., Canton, Ohio 44708

[21] Appl. No.: 790,498

[22] Filed: Nov. 12, 1991

[51] Int. Cl.⁵ ............................................... H02J 7/00
[52] U.S. Cl. ......................................... 320/2; 320/48
[58] Field of Search ...................... 320/2, 5, 6, 13, 14, 320/15, 48

[56] References Cited

U.S. PATENT DOCUMENTS

| | | | |
|---|---|---|---|
| 4,231,026 | 10/1980 | Sullivan | 320/48 X |
| 4,250,443 | 2/1981 | Kazamir | 320/2 |
| 4,588,938 | 5/1986 | Liautaud et al. | 320/2 |
| 4,714,868 | 12/1987 | Maruyama et al. | 320/5 |
| 4,755,733 | 7/1988 | Laliberté | 320/6 X |

FOREIGN PATENT DOCUMENTS 2147163  5/1985  United Kingdom .................... 320/2

Primary Examiner—Emanuel T. Voeltz
Assistant Examiner—Kristine Peckman
Attorney, Agent, or Firm—Hugh E. Smith

[57] ABSTRACT

A discharge apparatus for the continuous discharge of appliance batteries is provided to include a central housing formed with adjustable contact members to effect electrical communication with a battery and associated discharge components such as an illumination indicator light for the visual indication of culmination of a discharge procedure. The organization includes strap structure for mounting the housing to the associated battery.

5 Claims, 4 Drawing Sheets

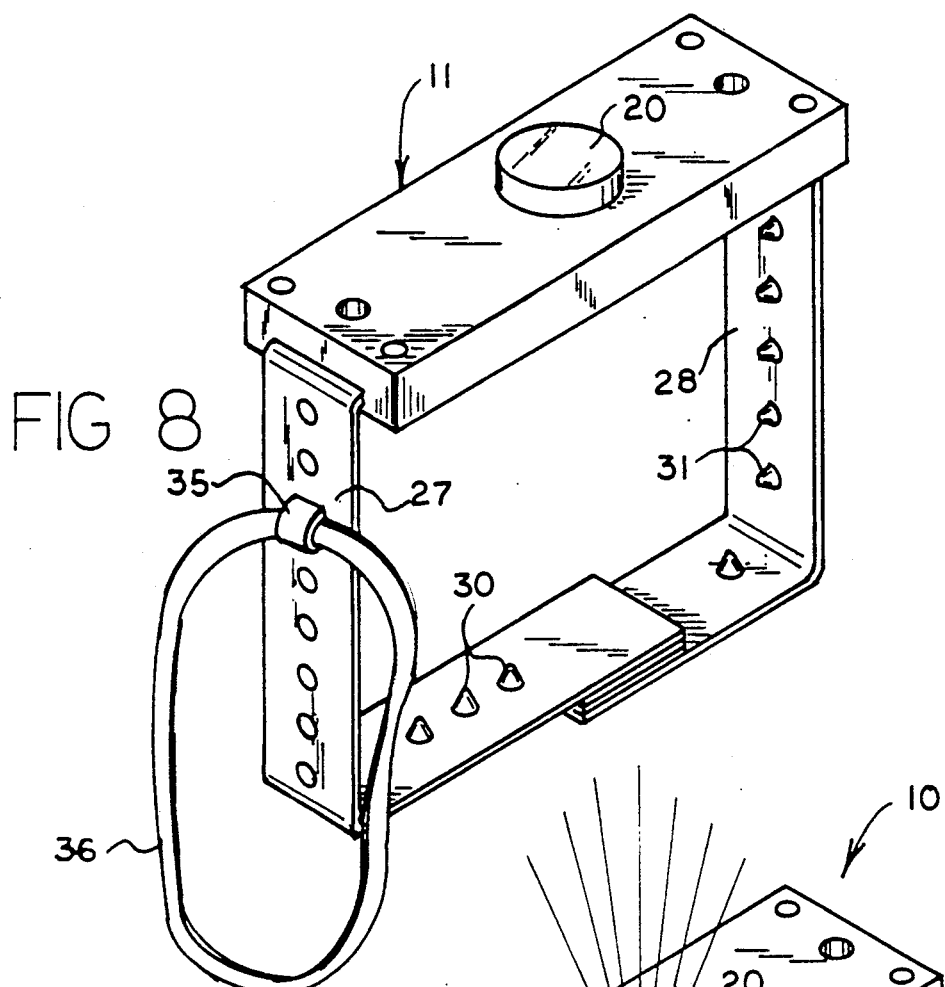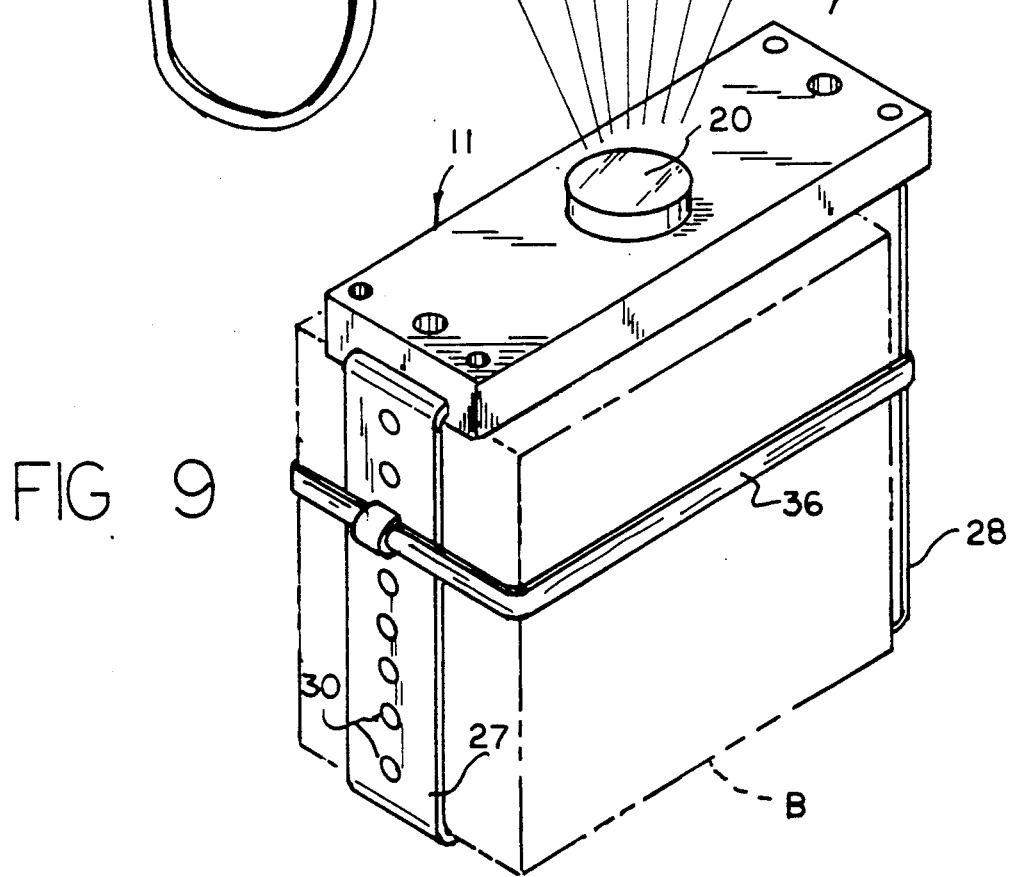

BATTERY DISCHARGE APPARATUS

BACKGROUND OF THE INVENTION

1. Field of the Invention

The field of invention relates to a battery charging and discharging apparatus, and more particularly pertains to a new and improved battery discharge apparatus wherein the same is arranged for the gradual discharge of an associated battery member.

2. Description of the Prior Art

Discharge apparatus of various types are utilized in the prior art to effect the complete discharging of an associated battery. In this manner, the memory cycle of the battery is reinforced to promote full capacity in the utilization of a fully charged battery subsequent to a discharging procedure.

Prior art organizations available are exemplified in U.S. Pat. No. 4,714,868 to Maruyama, et al. setting forth a charging and discharging control circuit for storage batteries.

U.S. Pat. No. 4,755,733 to Laliberte sets forth a battery charging and cycling device.

U.S. Pat. No. 4,231,026 to Sullivan sets forth a battery discharge level detection circuit to provide for increased loads directed to a battery during periodic times.

As such, it may be appreciated that there continues to be a need for a new and improved battery discharge apparatus as set forth by the instant invention which addresses both the problems of ease of use as well as effectiveness in construction in providing for the ease of mounting of an associated apparatus relative to a battery for its discharge and in this respect, the present invention substantially fulfills this need.

SUMMARY OF THE INVENTION

In view of the foregoing disadvantages inherent in the known types of battery discharge apparatus now present in the prior art, the present invention provides a battery discharge apparatus wherein the same is arranged to provide for an easily secured housing in discharge structure mounted to an associated battery construction. As such, the general purpose of the present invention, which will be described subsequently in greater detail, is to provide a new and improved battery discharge apparatus which has all the advantages of the prior art battery discharge apparatus and none of the disadvantages.

To attain this, the present invention provides a discharge apparatus for the continuous discharge of appliance batteries, such as for use in camcorders and the like, provided to include a central housing formed with adjustable contact members to effect electrical communication with a battery and associated discharge components such as an illumination indicator light for the visual indication of culmination of a discharge procedure. The organization includes strap structure for mounting the housing to the associated battery.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved battery discharge apparatus which has all the advantages of the prior art battery discharge apparatus and none of the disadvantages.

It is another object of the present invention to provide a new and improved battery discharge apparatus which may be easily and efficiently manufactured and marketed.

It is a further object of the present invention to provide a new and improved battery discharge apparatus which is of a durable and reliable construction.

An even further object of the present invention is to provide a new and improved battery discharge apparatus which is susceptible of a low cost of manufacture with regard to both materials and labor, and which accordingly is then susceptible of low prices of sale to the consuming public, thereby making such battery discharge apparatus economically available to the buying public.

Still yet another object of the present invention is to provide a new and improved battery discharge apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an isometric illustration of the invention in its complete configuration.

FIG. 9 is an isometric illustration of the invention mounted to an associated battery.

DESCRIPTION OF THE PREFERRED EMBODIMENT

Figure 1:
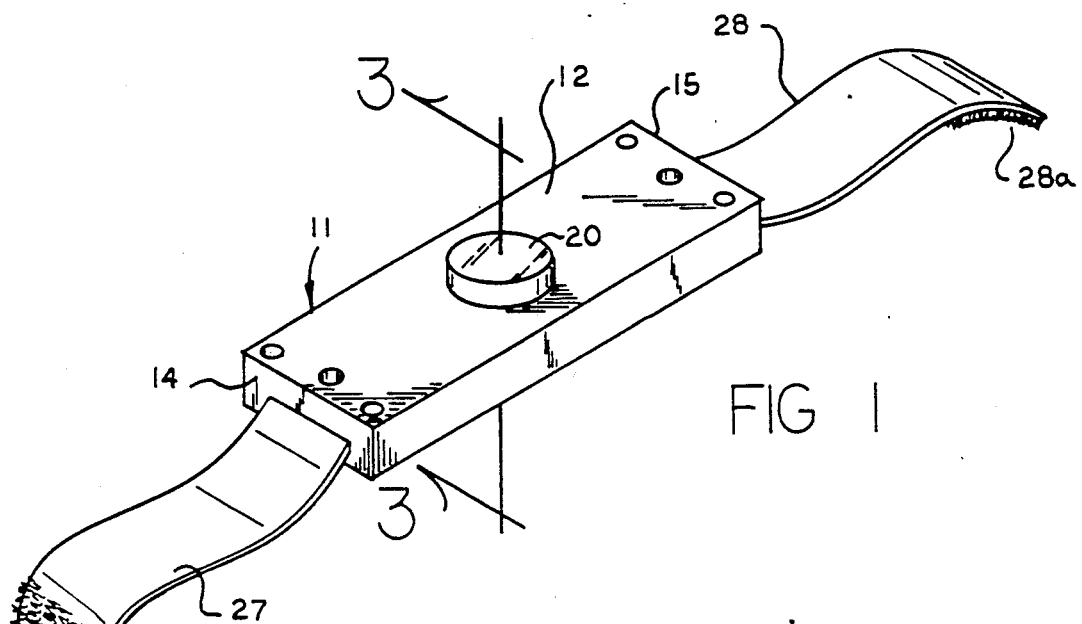
FIG. 1 is an isometric illustration of the instant invention.
Figure 2:
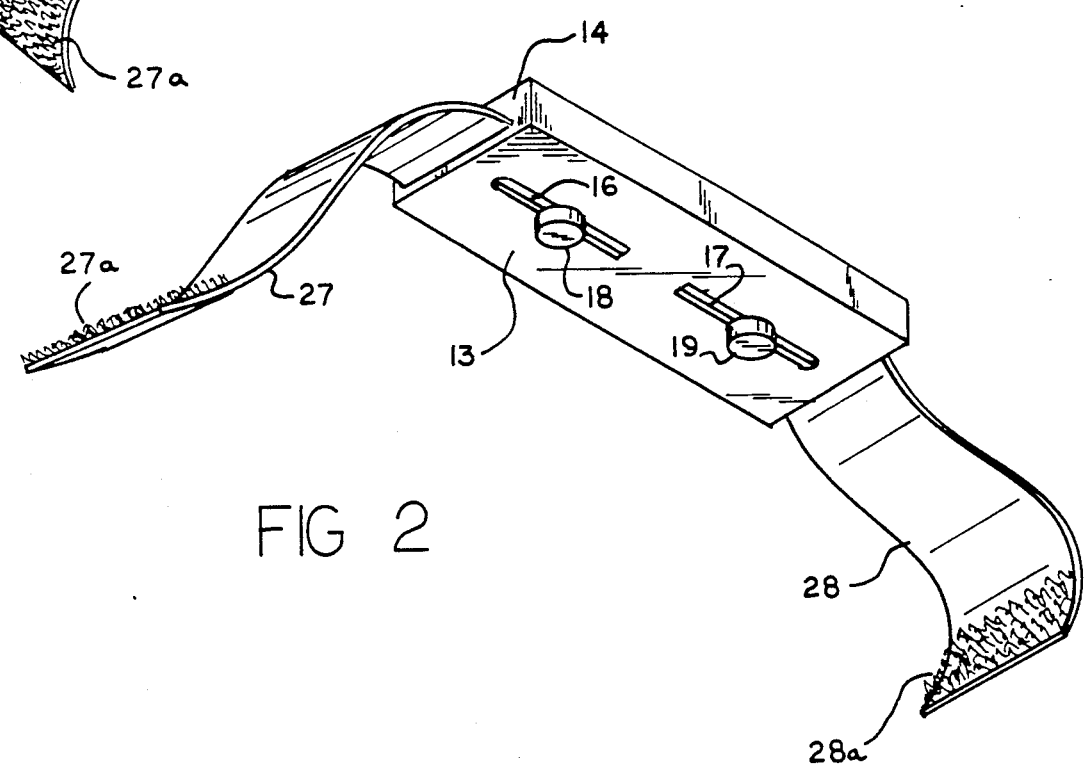
FIG. 2 is an isometric illustration of a bottom prospective of the instant invention.

With reference now to the drawings, and in particular to FIGS. 1 to 9 thereof, a new and improved battery discharge apparatus embodying the principles and concepts of the present invention and generally designated by the reference numeral 10 will be described.

Figure 3:
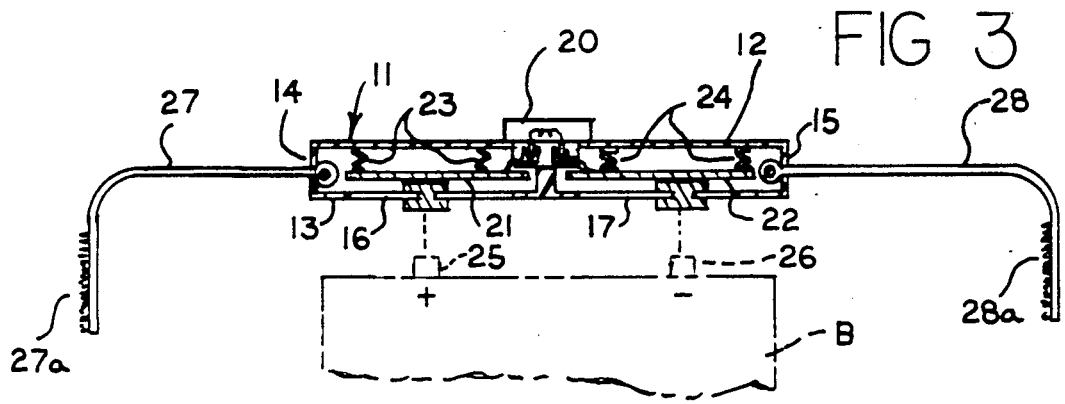
FIG. 3 is an orthographic view, taken along the lines 3—3 of FIG. 1 in the direction indicated by the arrows.
Figure 4:
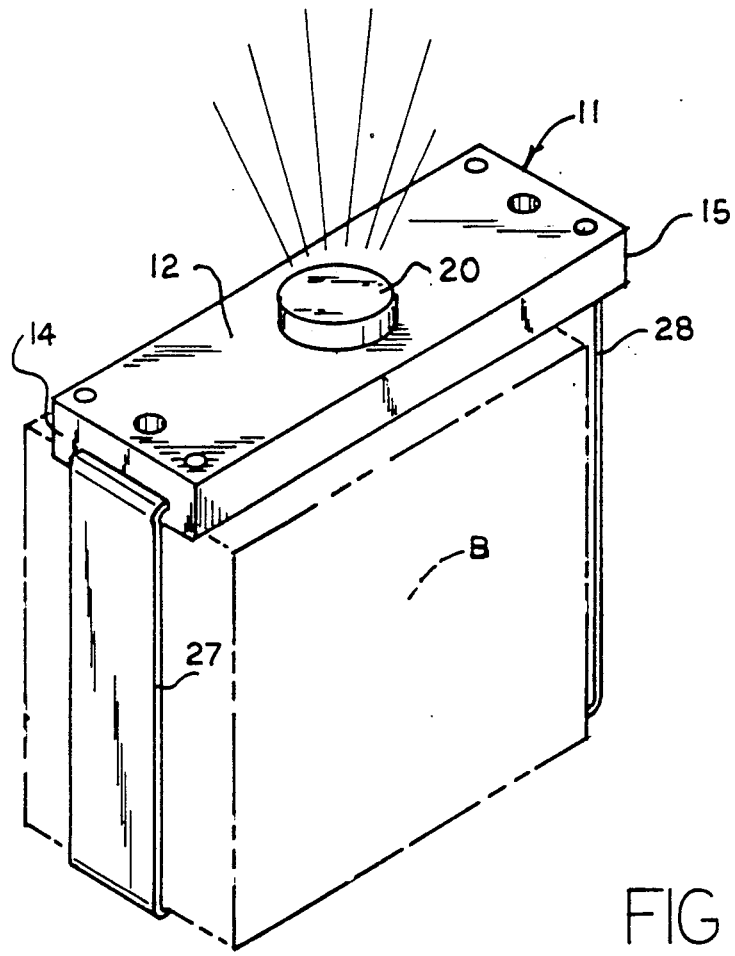
FIG. 4 is an isometric illustration of the invention mounted to an associated battery.
Figures 5, 6:
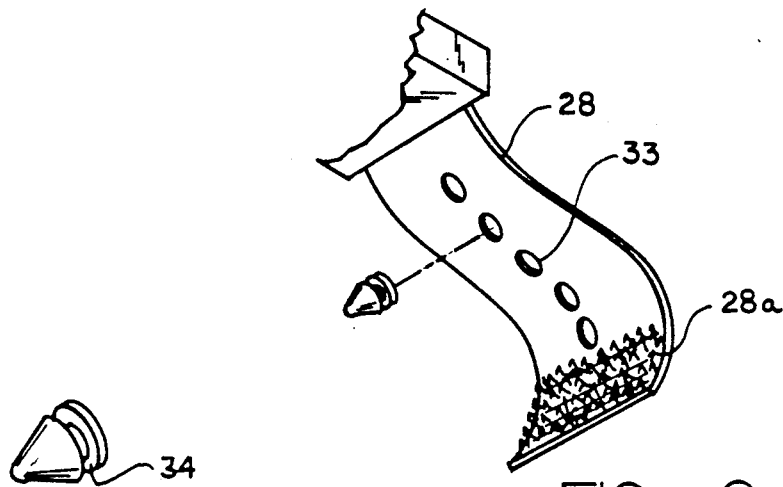
FIG. 5 is an isometric illustration of an engagement plug utilized by the invention.
FIG. 6 is an isometric illustration of a strap member of the invention in the mounting of the engagement plug thereto of a series of such engagement plugs.
Figure 7:
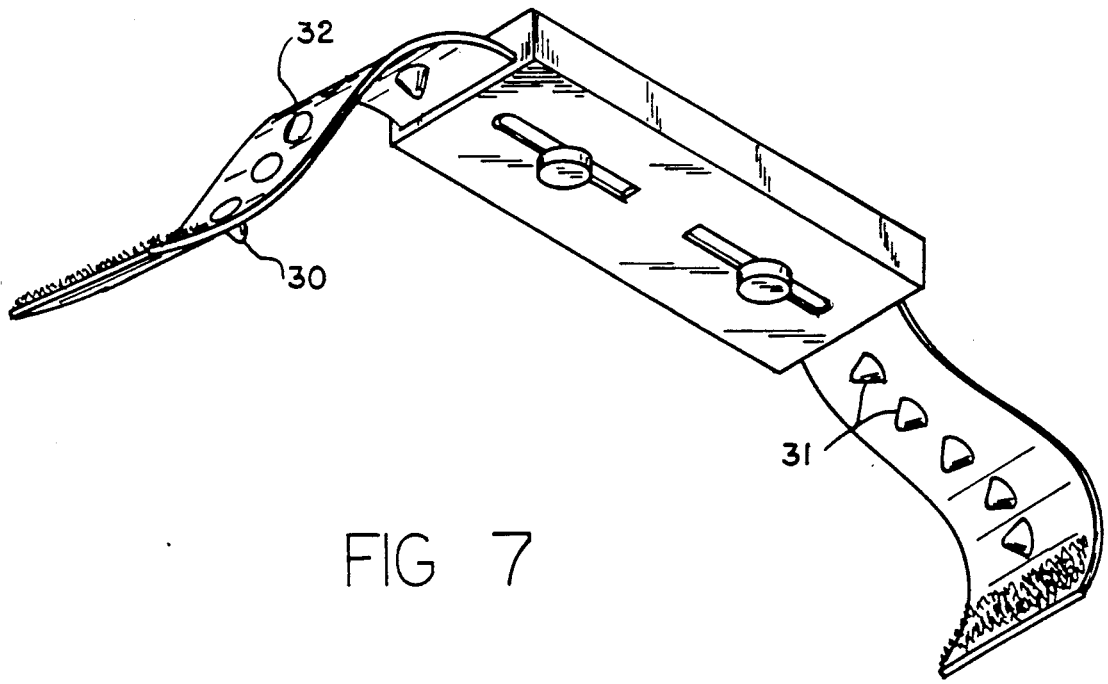
FIG. 7 is an isometric illustration of the invention utilizing the engagement plugs mounted to the straps.

More specifically, (See FIGS. 1 and 2 for example) the battery discharge apparatus of the instant invention essentially comprises a central housing 11 formed of an electrically non-conductive material of insulative properties, including a housing top wall 12 spaced from a housing bottom wall 13 to include housing first and second respective end walls 14 and 15. The housing bottom wall 13 includes a plurality of longitudinally aligned and spaced first and second slots 16 and 17, wherein the slots 16 and 17 are orthogonally oriented and positioned adjacent the respective first and second end walls 14 and 15. A first electrical contact boss 18 is slidably mounted within the first slot, with a second electrical contact boss 19 mounted slidably within the second slot 17. In FIG. 3, an illumination member is mounted and visible projecting upwardly relative to the top wall 12 to provide for enhanced visibility of the illumination member 20. A first electrically conductive plate 21 is mounted within the housing 11 between the top and bottom walls spaced from a second electrically conductive plate 22 mounted between the top and bottom walls within the housing 11. The first electrically conductive plate 21 is positioned in electrical communication with the first electrical contact boss 18, with the second electrically conductive plate 22 mounted in electrical engagement with the second electrical contact boss 19 in contiguous communication therewith. The first plate 21 includes first plate springs 23 captured between the top wall 12 and the first plate to bias the first plate into communication with the first boss 18, with second plate springs 24 mounted between the top wall 12 and the second plate 22 to bias the second plate into electrical communication with the second boss 19. In this manner, the first and second bosses 18 and 19 are slidably arranged within the respective first and second slots 16 and 17 for electrical engagement with respective first and second battery terminals 25 and 26 of an associated battery. A first strap 27 pivotally mounted and extending exteriorly of the first end wall 14 cooperates with a second strap 28 pivotally mounted extending exteriorly of the second end wall 15 for surrounding engagement relative to the associated battery "B". The first strap 27 includes first strap hook and loop fastener patch structure 27a, with the second strap 28 including second strap hook and loop fastener patch structure 28a to provide for selective and adjustable securement of the straps about an associated battery "B".

The straps may be further provided in a manner as illustrated in the FIGS. 5-9 with respective first strap first conical resilient plugs 30, with the second strap 28 provided with second strap second conical resilient plugs 31, wherein the conical plugs are each of an identical configuration formed of a resilient shape-retentive material. The first strap 30 includes first plug openings 32 longitudinally aligned along the strap, with the second strap 28 including second plate openings 33. The openings 32 and 33 respectively are arranged to receive the respective first and second plugs 30 and 31. Each of the plugs is of a type as illustrated in the FIG. 5, including a circular groove 34 arranged parallel to a planar base of each plug, and wherein each groove is arranged to receive an associated opening 32 or 33 to selectively affix the plugs within the straps to provide frictional engagement when the straps are secured about the associated battery. Further, to insure a non-slip association with the organization relative to the associated battery, a band support loop 35, such as illustrated, is mounted to the first strap 27, but of course may be mounted to the second strap 28 as required between the straps opposed distal ends, wherein the band support loop 35 slidably engages an elastomeric band 36 therewithin. The elastomeric band 36 is thereby surroundingly engaged about the battery "B" in an orthogonal relationship relative to the straps 27 and 28 and substantially parallel relative to the housing 11 to provide for securement of the battery within the organization to maintain and insure communication of the electrical bosses 18 and 19 with the battery terminals 25 and 26 respectively. As illustrated, the respective first and second plates 21 and 22 are each in electrical communication with the illumination member 20 and with the first and second bosses 18 and 19 in electrical communication with the respective first and second plates, the battery "B" directs electrical current to the illumination member 20 until complete discharge of the associated battery is effected and indicated by the absence of the illumination member directing illumination therefrom.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A battery discharge apparatus for securement about an associated battery to effect its discharge, wherein the apparatus comprises, a central housing, the central housing including a housing top wall spaced from a housing bottom wall, and the housing further including a first end wall spaced from a second end wall at opposed distal ends of the central housing, and an illumination member fixedly mounted within the top wall projecting exteriorly of the top wall, and a first electrical contact boss projecting exteriorly of the bottom wall, and a second electrical contact boss extending exteriorly of the bottom wall, wherein the first electrical contact boss and the second electrical contact boss are in a spaced relationship relative to one another, and wherein the first electrical contact boss and the second electrical contact boss are each in electrical communication with the illumination member, whereupon positioning of the first electrical contact boss and the second electrical contact boss in communication with the respective first and second battery terminal effects discharge of the battery, and securement means for securement of the central housing to the battery, and the bottom wall includes a first slot positioned adjacent the first end wall and orthogonally oriented relative to the first end wall, and a second slot positioned adjacent the second end wall and orthogonally oriented relative to the second end wall, wherein the first slot and the second slot are longitudinally aligned relative to one another, and the first electrical contact boss is slidably mounted within the first slot, and the second electrical contact boss is slidably mounted within the second slot, and a first electrically conductive plate mounted within the housing, and a second electrically conductive plate mounted within the housing, wherein the first electrical contact boss is in electrical communication with the first plate, and the second electrical contact boss is in electrical communication with the second plate, and the first plate is in electrical communication with the illumination member and the second plate is in electrical communication with the illumination member.

2. An apparatus as set forth in claim 1 including first plate springs mounted between the top wall and the first plate to bias the first plate into electrical communication with the first electrical contact boss, and second plate springs mounted between the top wall and the second plate to bias the second plate into electrical communication with the second boss, and the first plate is arranged in a spaced parallel relationship relative to the housing bottom wall and is coextensive with the first slot, and the second plate is arranged in a spaced relationship relative to the housing bottom wall coextensive with the second slot.

3. An apparatus as set forth in claim 2 wherein the securement means includes a first strap pivotally mounted to the first end wall, and a second strap pivotally mounted to the second end wall, the first strap includes a first hook and loop fastener patch mounted to an outer distal end of the first strap, and the second strap includes a second strap hook and loop fastener patch mounted to an outer distal end of the second strap, wherein the first hook and loop fastener patch and the second hook and loop fastener patch are arranged for securement relative to one another in surrounding relationship relative to a battery.

4. An apparatus as set forth in claim 3 wherein the first strap includes a series of longitudinally aligned first plug openings, and the second strap includes a series of longitudinally aligned second openings, and the first openings and the second openings are arranged to respectively receive first conical resilient plug members and second conical resilient plug members respectively, and each of the respective first and second conically resilient plug members are arranged in confronting relationship relative to one another when the first strap and the second strap are secured to the battery, and each plug of the first and second resilient plugs includes a circular groove arranged parallel to a planar base of each of said plugs wherein each groove is arranged for receiving of an opening of the first plug opening and the second plug opening of the first strap and the second strap respectively.

5. An apparatus as set forth in claim 4 including at least one band supporting loop mounted to the first strap, the band supporting loop slidably receives an elastomeric band therethrough, and the band supporting loop is positioned between the first end wall and the outer distal end of the first strap.

* * * * *